US010895865B2

(12) United States Patent
Endou

(10) Patent No.: US 10,895,865 B2
(45) Date of Patent: Jan. 19, 2021

(54) NUMERICAL CONTROLLER

(71) Applicant: FANUC CORPORATION, Yamanashi (JP)

(72) Inventor: Katsuhiro Endou, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 51 days.

(21) Appl. No.: 16/166,410

(22) Filed: Oct. 22, 2018

(65) Prior Publication Data

US 2019/0121324 A1    Apr. 25, 2019

(30) Foreign Application Priority Data

Oct. 25, 2017    (JP) .................................. 2017-206424

(51) Int. Cl.
  *G05B 19/414*   (2006.01)
  *G05B 19/4063*  (2006.01)
  *G05B 19/4093*  (2006.01)

(52) U.S. Cl.
  CPC ..... G05B 19/4145 (2013.01); G05B 19/4063 (2013.01); G05B 19/40937 (2013.01); *G05B 2219/32226* (2013.01)

(58) Field of Classification Search
  None
  See application file for complete search history.

(56) References Cited

U.S. PATENT DOCUMENTS

| | | | | | |
|---|---|---|---|---|---|
| 2002/0049512 | A1* | 4/2002 | Mizuno | ............ | G05B 19/41845 700/169 |
| 2004/0034443 | A1* | 2/2004 | Hosokawa | ........... | G05B 19/408 700/181 |
| 2007/0038328 | A1* | 2/2007 | Endou | .................. | G05B 19/408 700/170 |
| 2011/0047301 | A1* | 2/2011 | Yu | ............................. | G06F 3/00 710/16 |
| 2012/0017199 | A1* | 1/2012 | Ogura | ....................... | G06F 8/62 717/124 |
| 2016/0033956 | A1* | 2/2016 | Miyazaki | ............. | G05B 19/408 700/159 |

(Continued)

FOREIGN PATENT DOCUMENTS

| JP | H08-197787 A1 | 8/1996 |
|---|---|---|
| JP | 09305212 A | 11/1997 |

(Continued)

OTHER PUBLICATIONS

Notification of Reasons for Refusal for Japanese Application No. 2017206424, dated Nov. 12, 2019 with translation, 6 pages.

*Primary Examiner* — Daxin Wu
(74) *Attorney, Agent, or Firm* — RatnerPrestia

(57) ABSTRACT

A numerical controller capable of temporarily executing dedicated function software includes a dedicated function software reading unit configured to read, in response to a reading condition being satisfied, the dedicated function software into a primary storage area mainly accessed by a CPU, dedicated function software execution unit configured to execute the dedicated function software as a process in response to an execution condition being satisfied, and a dedicated function software termination unit configured to stop execution of the process of the dedicated function software and delete the dedicated function software from the primary storage area in response to a termination condition being satisfied.

4 Claims, 6 Drawing Sheets

(56) References Cited

U.S. PATENT DOCUMENTS

2016/0109877 A1* 4/2016 Ishiwari ............. G05B 19/4155
                                                        700/173
2016/0349739 A1* 12/2016 Satake ............... G05B 19/4155

FOREIGN PATENT DOCUMENTS

| JP | 10133870 A | 5/1998 |
| JP | H11-53219 A | 2/1999 |
| JP | 2005-284804 A | 10/2005 |
| JP | 20100258617 A | 11/2010 |
| JP | 2012022621 A | 2/2012 |
| JP | 5045576 B2 | 10/2012 |

* cited by examiner

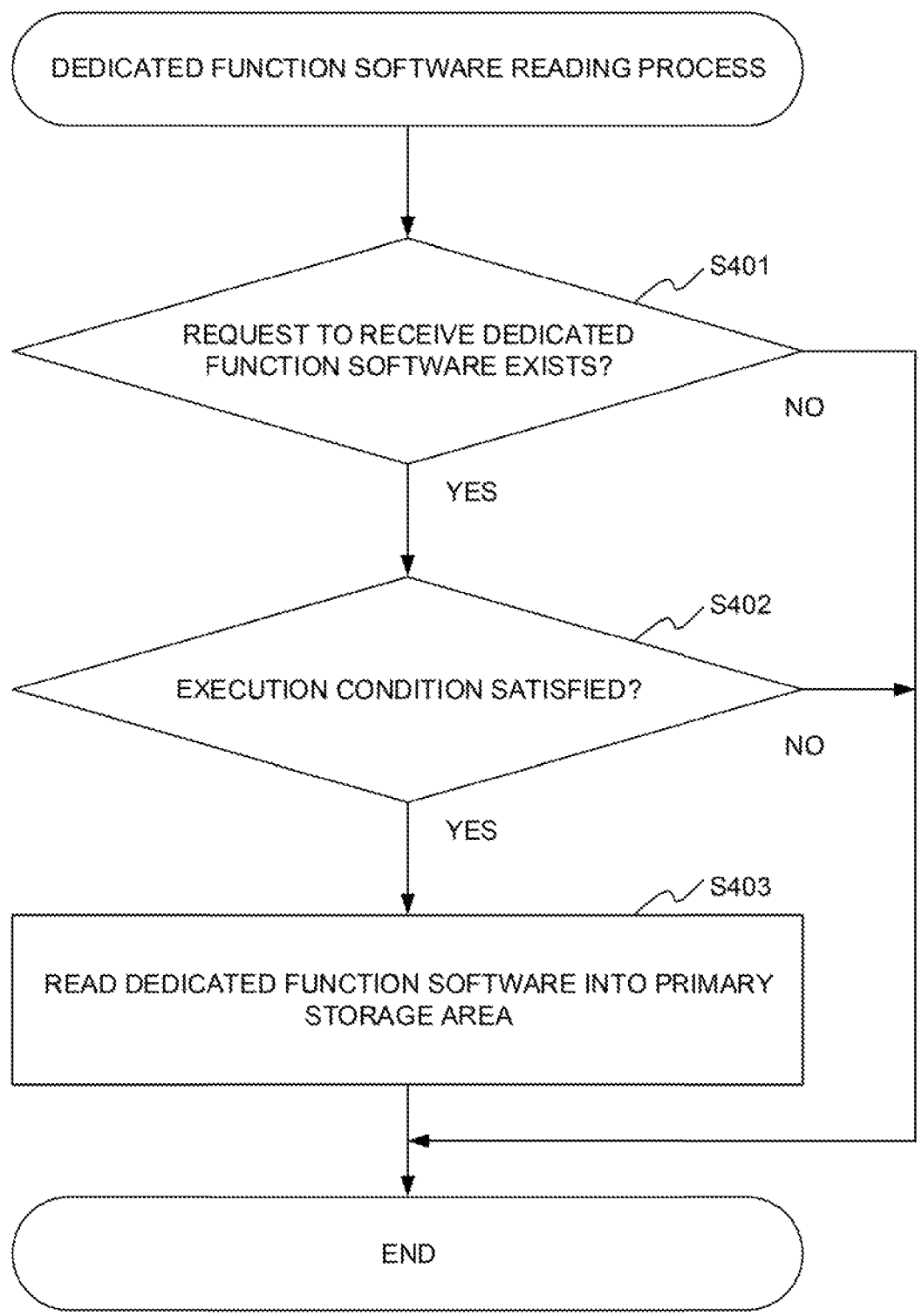

NUMERICAL CONTROLLER

CROSS-REFERENCE TO RELATED APPLICATION

This application is a new U.S. Patent Application that claims benefit of Japanese Patent Application No. 2017-206424, filed Oct. 25, 2017, the disclosure of this application is being incorporated herein by reference in its entirety for all purposes.

BACKGROUND OF THE INVENTION

1. Field of the Invention

The present invention relates to a numerical controller, and in particular to a numerical controller capable of temporarily executing software for a dedicated function.

2. Description of the Related Art

There have been needs for temporarily adding dedicated functions such as adjustment, testing, maintenance, inspection, and data collection of a machine tool or the like (hereinafter referred to as "machine") to a numerical controller of the machine. Numerical controllers often include customization functions (e.g., macro executor and C language executor) to accommodate such needs. And the needs will be fulfilled by the software for realizing the dedicated functions (hereinafter referred to as "dedicated function software") being executed using this customization function.

The dedicated function software is stored in a flash read-only memory (FROM) unit of the numerical controller along with system software of the numerical controller, peripheral software, a machining program, maintenance information files, and the like. When the numerical controller is activated, dedicated function software is read from the FROM unit to a dynamic random access memory (DRAM) unit and executed by a central processing unit (CPU) whenever necessary.

In general, dedicated function software used in applications such as adjustment, testing, maintenance, inspection, and data collection of the machine is only temporarily used unlike always used system software and the like. However, a conventional numerical controller needs to store in advance the dedicated function software used in the above-mentioned applications in the FROM unit and make it resident upon the DRAM unit from the start to the end of the numerical controller.

The conventional numerical controller is a so-called embedded system, and it is configured by reliable and costly resources (DRAM, FROM, SRAM, etc.). According to conventional schemes, since the dedicated function software is always stored in the FROM unit, it is necessary to increase the capacity of the FROM unit to implement many additional dedicated functions, which increases the costs. As a result, there is a need for a numerical controller that can provide dedicated function software by, for example, an external storage device or communication unit, without depending on an FROM unit.

As prior-art technologies in this context, Japanese Patent Laid-Open No. 2005-284804 and Japanese Patent Laid-Open No. 11-053219 may be mentioned. Japanese Patent Laid-Open No. 2005-284804 discloses a robot control device capable of transferring a teaching program from an external memory unit to a RAM unit of a control device. Also, Japanese Patent Laid-Open No. 11-053219 discloses a device that can read a verification program from an external recording medium and incorporate it into software for a control device.

Meanwhile, the teaching program transferred to the RAM unit of the control device described in Japanese Patent Laid-Open No. 2005-284804 is command data for operating the robot and the machine, and it is a kind of data from the viewpoint of the system software. This is inherently different from the dedicated function software executed as a process of the system software.

Also, the device described in Japanese Patent Laid-Open No. 11-053219 is a personal computer, that is, a general-purpose computer, whose operating system usually includes a feature for enabling dynamic addition of resources (external storage devices). Meanwhile, the conventional numerical controller has constraints peculiar to the embedded system as described above, and does not have any feature for enabling dynamic expansion of resources. Accordingly, the inventions described in Patent Literatures 1 and 2 cannot directly solve the above-mentioned problems of the conventional numerical controller.

In addition, the conventional numerical controller also involves the following problems. Dedicated functions may include expertise unique to machine manufacturers (proprietary adjustment method, etc.) and confidentiality (machine design information, etc.). Also, some dedicated functions may temporarily disable the security function of the machine, which may be risky if erroneously used by an end user. It is consequently desirable that dedicated function software should not stay on the memory unit (DRAM etc.) to the extent possible unless it is necessary. However, a problem of the conventional numerical controller is that the dedicated function software continues to stay on the memory unit from immediately after startup until termination of it.

Further, the conventional dedicated function software is read from the FROM unit into the DRAM unit in response to turning on the power of the numerical controller. As a result, it is sometimes necessary to temporarily shut off the power supply of the numerical controller and restart it in order to execute the dedicated function. However, it is often difficult to shut off the power supply, for example, in a machine or the like which performs continuous processing (for example, an automobile production line).

SUMMARY OF THE INVENTION

An object of the present invention, which has been made to solve such problems, is to provide a numerical controller capable of temporarily executing dedicated function software.

A numerical controller according to an embodiment of the present invention is a numerical controller capable of executing dedicated function software, the numerical controller includes a dedicated function software reading unit configured to read, in response to a reading condition being satisfied, the dedicated function software into a primary storage area mainly accessed by a CPU, a dedicated function software execution unit configured to execute the dedicated function software as a process in response to an execution condition being satisfied, and a dedicated function software termination unit configured to stop execution of the process of the dedicated function software and delete the dedicated function software from the primary storage area in response to a termination condition being satisfied.

In the numerical controller according to an embodiment of the present invention, the reading condition is satisfied when the dedicated function software stored in an external storage device is detected.

In the numerical controller according to an embodiment of the present invention, the reading condition is satisfied when a loading request to load the dedicated function software is detected via an external communication function.

In the numerical controller according to an embodiment of the present invention, the termination condition is satisfied when removal of the external storage device is detected.

In the numerical controller according to an embodiment of the present invention, the termination condition is satisfied when disconnection of the external communication function is detected or when a deletion request to delete the dedicated function software is detected via the external communication function.

In the numerical controller according to an embodiment of the present invention, the termination condition is satisfied when termination of the dedicated function software is detected.

In the numerical controller according to an embodiment of the present invention, the dedicated function software reading unit is configured to urge a user to select the dedicated function software that should be read into the primary storage area in response to a plurality of pieces of the dedicated function software being detected.

According to the present invention, it is made possible to provide a numerical controller capable of temporarily executing a dedicated function software.

BRIEF DESCRIPTION OF THE DRAWINGS

The foregoing and other objects and features of the present invention will become apparent from the description of the following examples with reference to the accompanying drawings, in which:

FIG. 7 is a flowchart illustrating operation of the numerical controller of the second example.

DETAILED DESCRIPTION OF THE PREFERRED EMBODIMENTS

Figure 1:
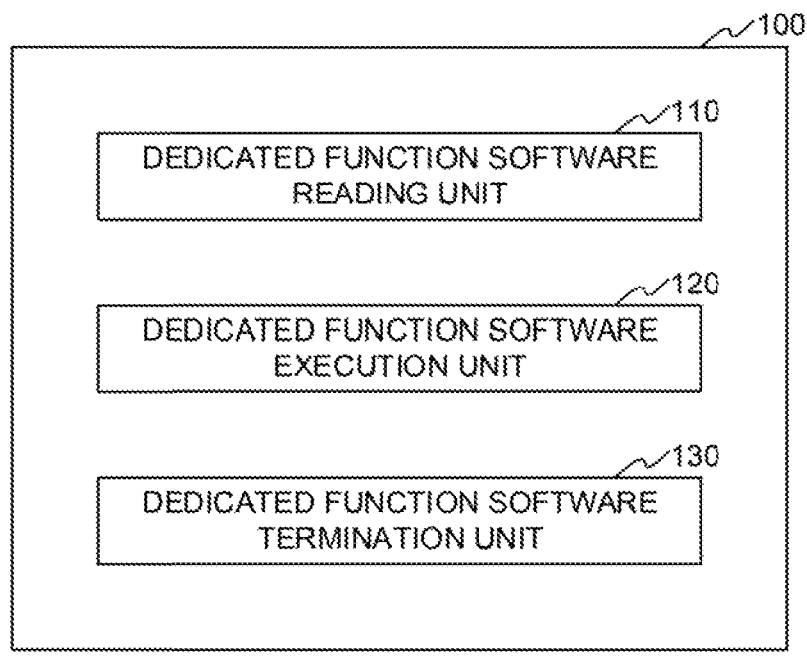
FIG. 1 is a block diagram illustrating a configuration of a numerical controller.

A numerical controller 100 according to an embodiment of the present invention will be described hereinbelow with reference to the drawings. FIG. 1 is a block diagram illustrating a functional configuration of the numerical controller 100. The numerical controller 100 includes a dedicated function software reading unit 110, a dedicated function software execution unit 120, and a dedicated function software termination unit 130. The numerical controller 100 includes a CPU, a primary storage area (volatile memory such as DRAM, etc.) mainly accessed by the CPU, a secondary storage area for storing data and programs to be read onto the primary storage area, (non-volatile memory such as FROM, etc.), an input/output unit, a communication unit, and the like. Typically, the dedicated function software reading unit 110, the dedicated function software execution unit 120, and the dedicated function software termination unit 130 are processing units that are logically implemented by the CPU executing a program or programs stored in the storage area.

When an external storage device (e.g., a USB memory device, an SD card, a PCMCIA card, etc.) is attached to the numerical controller 100, for example, the dedicated function software reading unit 110 reads the dedicated function software stored in the external storage device onto the primary storage area of the control device. Alternatively, for example, when loading of dedicated function software is requested via an external communication function (Ethernet™ communication, etc.) of the numerical controller 100, the dedicated function software reading unit 110 reads the dedicated function software into the primary storage area of the numerical controller 100.

In this manner, the dedicated function software reading unit 110 automatically loads the dedicated function software into the primary storage area, where the automatic loading is triggered by attachment of the external storage device or the request of the external communication function. Alternatively, the dedicated function software reading unit 110 can read the dedicated function software into the primary storage area when a predetermined reading condition is satisfied. The reading condition may be set as appropriate. For example, the dedicated function software reading unit 110 may present (typically displays) to the user one or more pieces of dedicated function software stored in the external storage device or requested via the external communication function and only read the dedicated function that has been selected by the user into the primary storage area. Alternatively, the dedicated function software reading unit 110 may automatically read or present to the user only the ones, which are compatible with the numerical controller 100 or the machine, from among the one or more pieces of dedicated function software stored in the external storage device or requested via the external communication function. It is to be noted that the determination of compatibility of the dedicated function software with the numerical controller 100 or the machine can be implemented by appropriate processing, for example, by the dedicated function software itself reading an ID of the numerical controller 100 or the machine and comparing the ID that has been read with IDs listed in a compatible ID list held in advance by the dedicated function software.

By virtue of this, the numerical controller 100 does not need to read the dedicated function software from the FROM unit as in the conventional case, and is allowed to read the dedicated function software via any appropriate external storage device or external communication function. In addition, the dedicated function software does not need to be read at the time of turning on the numerical controller 100 and it is made possible to read the dedicated function software at any appropriate timing.

The dedicated function software execution unit 120 is configured to execute the dedicated function software read into the primary storage area as a process (task) of the numerical controller 100.

Here, it is preferable that the dedicated function software execution unit 120 executes the dedicated function software when a predetermined execution condition is satisfied.

Although it is possible to specify the execution condition as appropriate, it is typically possible to verify whether or not the constraint of the resource possessed by the numerical controller 100 as an embedded system can be overcome before execution. For example, the dedicated function software execution unit 120 verifies whether or not the free space of the DRAM unit, the usage status of the CPU, etc. allow for a capacity sufficient for executing the dedicated function software, and the execution condition may be regarded as being satisfied when such a capacity is available. As the prior-art technologies relating to this aspect, for example, Japanese Patent Laid-Open No. 8-197787 and Japanese Patent No. 5045576 may be mentioned. Japanese Patent Laid-Open No. 8-197787 discloses a printing device that reads data in accordance with the free space of DRAM from ROM to DRAM. Also, Japanese Patent No. 5045576 discloses a multiprocessor system that allocates execution processes in accordance with the load state of a CPU.

The dedicated function software termination unit 130 is configured to stop execution of the process of the dedicated function software when a predetermined termination condition is satisfied and deletes the dedicated function software from the primary storage area.

The termination condition can be specified as appropriate. The dedicated function software termination unit 130 may regard the termination condition as being satisfied, for example, when an operation to turn off the power supply of the numerical controller 100 is performed; when an operation to terminate the dedicated function is performed; when an operation to remove the external storage device from the numerical controller is performed; and/or when an operation to disconnect the network is performed. Alternatively, when the above-described various operations are performed, the dedicated function software termination unit 130 may present (typically display) to the user an inquiry as to whether or not the dedicated function software should be terminated, and may regard the termination condition as being satisfied when the user opts for the termination.

In this manner, the dedicated function software is deleted from the temporary storage area at an appropriate timing without waiting for the termination of the numerical controller 100. As a result, the time during which the dedicated function software remains on the primary storage area can be minimized, so that it is made possible to suppress the risk of, for example, erroneous execution of the dedicated function by the user and exposure to unintended acquisition of information related to the dedicated function software.

First Example

As a first example, the processing by the numerical controller 100 to read from the external storage device, execute, and terminate the dedicated function software will be described.

Figure 2:
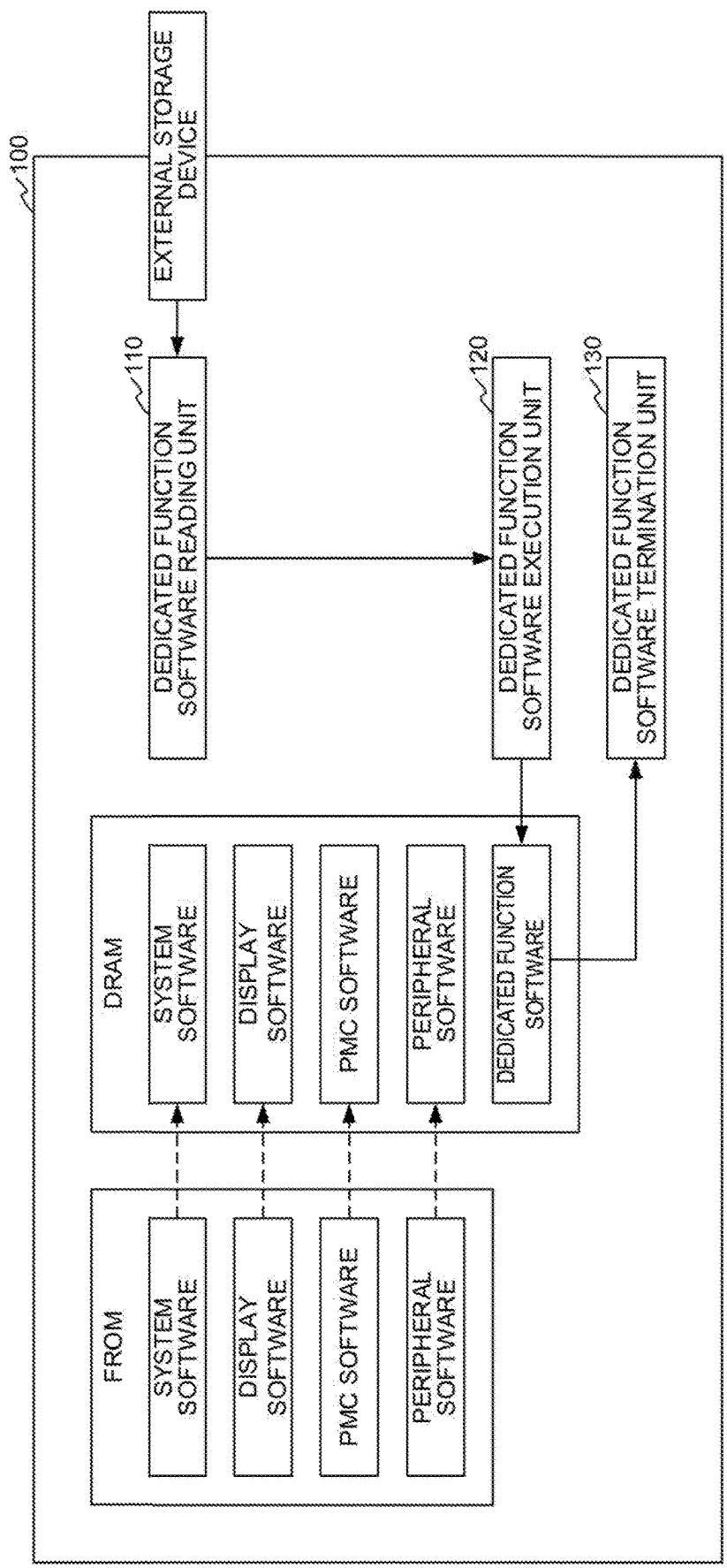
FIG. 2 is a block diagram illustrating the configuration of the numerical controller according to a first example.

FIG. 2 is a block diagram schematically illustrating the functional configuration of the numerical controller 100 according to the first example. The numerical controller 100 has a DRAM unit as the primary storage area, an FROM unit as the secondary storage area, the dedicated function software reading unit 110, the dedicated function software execution unit 120, and the dedicated function software termination unit 130.

The numerical controller 100, when power is turned on, executes various pieces of software stored in the FROM unit (system software, display software, programmable machine controller (PMC) software, peripheral software, etc. of the numerical controller 100) onto the DRAM unit in the same or similar manner as in conventional numerical controllers. The software read onto the DRAM unit is executed by the CPU.

Figure 3:
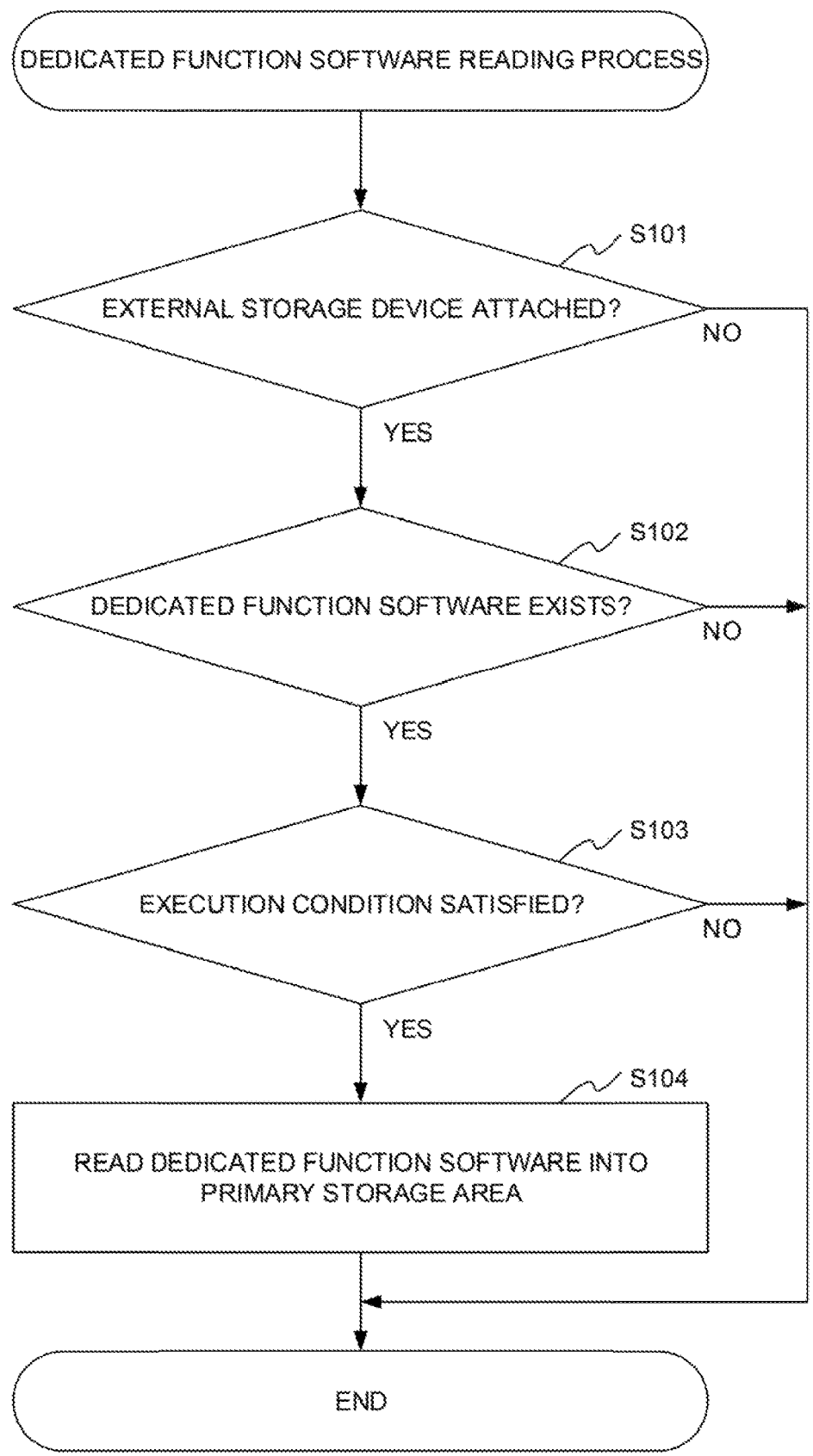
FIG. 3 is a flowchart illustrating operation of the numerical controller 100 of the first example.
Figure 4:
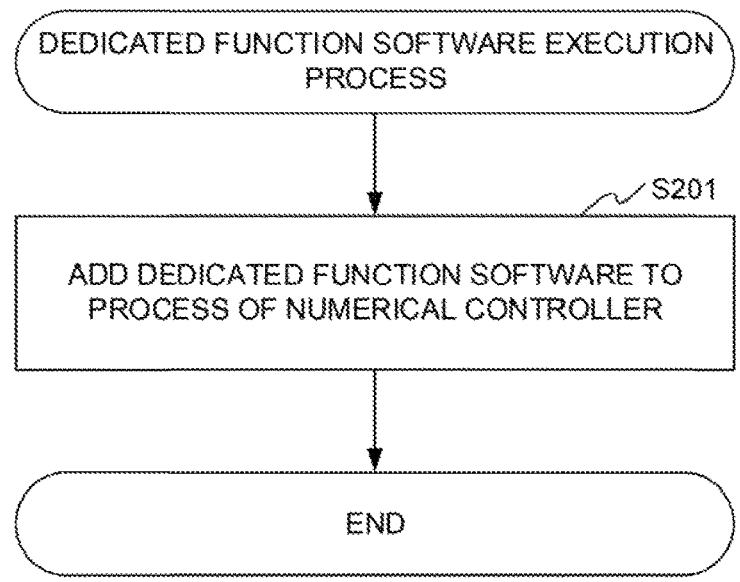
FIG. 4 is a flowchart illustrating the operation of the numerical controller of the first example and a second example.
Figure 5:
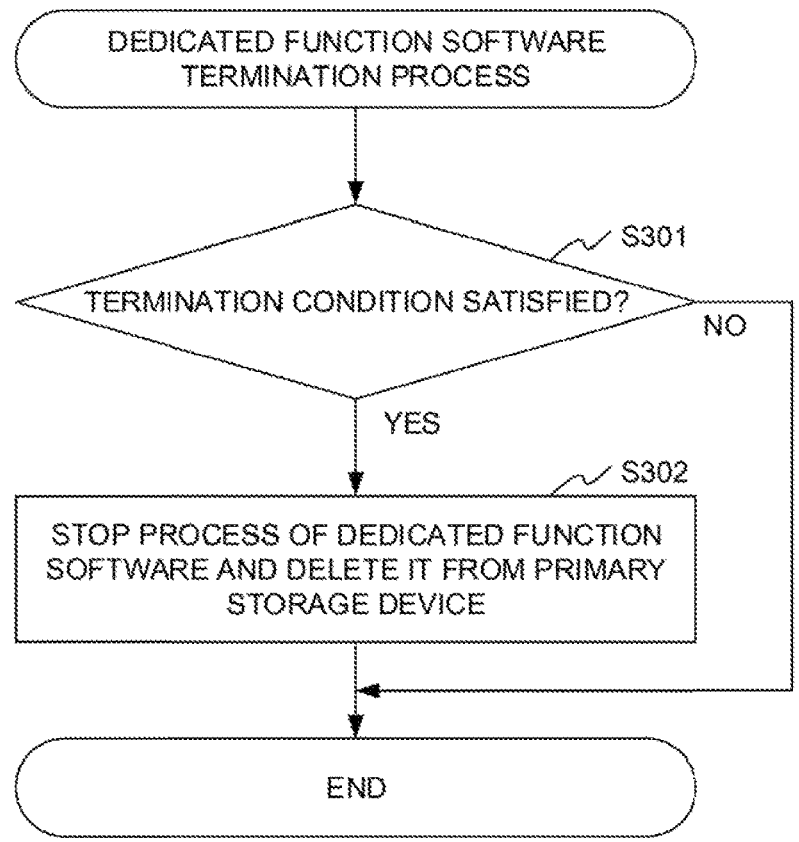
FIG. 5 is a flowchart illustrating the operation of the numerical controller of the first example and the second example.

FIGS. 3 to 5 are flowcharts illustrating operations characteristic in the numerical controller 100 according to the first example.

S101: The numerical controller 100 detects the fact that the external storage device has been attached to the numerical controller 100. It is assumed in this example that a USB memory device storing software for a dedicated function(s) for maintenance/inspection is used as the external storage device. When the USB memory device has been detected, the process proceeds to the step S102.

S102: The dedicated function software reading unit 110 searches the attached USB memory device for the dedicated function software. When the dedicated function software has been found, the process proceeds to the step S103.

S103: When the dedicated function software execution unit 120 has found the dedicated function software, the dedicated function software execution unit 120 determines the execution condition of the dedicated function software. If the execution condition is satisfied, the process proceeds to the step S104.

S104: The dedicated function software reading unit 110 reads the dedicated function software into the primary storage area of the numerical controller. The process then proceeds to the step S201.

S201: The dedicated function software execution unit 120 executes the dedicated function software read into the DRAM unit as a process of the numerical controller 100. In accordance with this example, the maintenance and inspection work are performed by the executed dedicated function software. Upon completion of the maintenance and inspection work, the user performs the termination operation to terminate the dedicated function software. Alternatively, the user removes the USB memory device from the numerical controller 100.

S301: When the dedicated function software termination unit 130 has detected the termination operation to terminate the dedicated function software, which is the termination condition, or has detected removal of the USB memory device, which is the termination condition, then the process proceeds to the step S302.

S302: The dedicated function software termination unit 130 stops the process of the dedicated function software and deletes the dedicated function software from the DRAM unit.

Second Example

As a second example, a process in which the numerical controller 100 reads, executes, and terminates the dedicated function software via an external communication function will be described.

Figure 6:
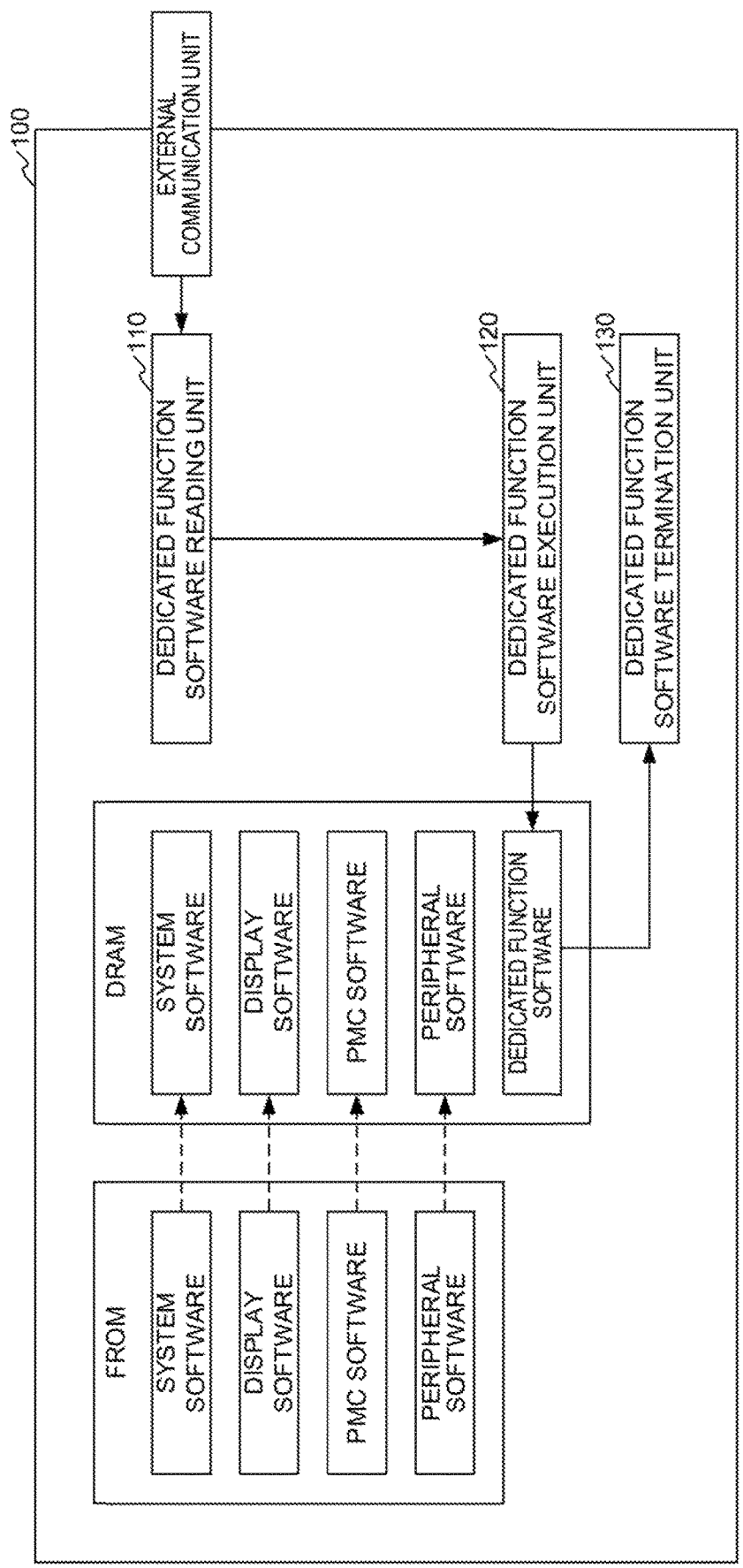
FIG. 6 is a block diagram illustrating a configuration of the numerical controller of the second example.

FIG. 6 is a block diagram schematically illustrating the functional configuration of the numerical controller 100 according to the second example. The main difference from the first example resides in the fact that the dedicated function software reading unit 110 is configured to acquire the dedicated function software via the external communication function.

FIGS. 7, 4, and 5 are flowcharts illustrating the characteristic operations of the numerical controller 100 according to the second example.

S401: The numerical controller 100 receives a loading request to load the dedicated function software via the external communication function. It is assumed in this example that a loading request to load dedicated function software for data logger is transmitted to the numerical controller 100 from a host computer (FANUC FIELD system, etc.) connected to the numerical controller 100 via the Ethernet™. When the loading request has been detected, the process proceeds to the step S402.

S402: The dedicated function software reading unit 110 determines the execution condition of the dedicated function software. Typically, the determination of the execution condition includes checking of the compatibility of the dedicated function software with the machine and/or the numerical controller. The host computer often transmits loading requests to multiple numerical controllers all at once. The dedicated function software reading unit 110 is responsible for sorting out only the ones, which fit the machine to which the unit pertains, from among such loading requests. When the execution condition is satisfied, the process proceeds to the step S403.

S403: The dedicated function software reading unit 110 reads the dedicated function software into the primary storage area of the numerical controller. The process proceeds to the step S201.

S201: The dedicated function software execution unit 120 executes the dedicated function software read into the DRAM unit as a process of the numerical controller 100. In this example, log data acquisition processing of the received data in the numerical controller 100 is executed by the executed dedicated function software. Upon completion of the log acquisition process, the host computer requests the numerical controller 100 to delete the dedicated function software.

S301: When the dedicated function software termination unit 130 has received the deletion request of the dedicated function software, which is the termination condition, then the process proceeds to the step S302.

S302: The dedicated function software termination unit 130 stops the process of the dedicated function software and deletes the dedicated function software from the DRAM unit.

According to this embodiment, the numerical controller 100 can read the dedicated function software into the primary storage area when the predetermined reading condition is satisfied. As a result, the dedicated function software can be read at an appropriate timing, which is not limited to the timing at which the device is powered on. Also, since the dedicated function software can be read via the external storage device or the external communication function, costly implementation of an additional FROM area or unit is not necessitated.

In addition, according to this embodiment, the numerical controller 100 can execute the dedicated function software when the predetermined execution condition is satisfied. This makes it possible to execute the dedicated function software at an appropriate timing even on a numerical controller having extensive resource constraints.

Further, according to this embodiment, the numerical controller 100 can execute the dedicated function software when a predetermined termination condition is satisfied. As a result, the dedicated function software can be terminated at an arbitrary timing, which is not limited to the timing at which the device is shut down. In addition, since the time for which the dedicated function software remains on the primary storage area can be shortened, the device is robust against, for example, unintended execution of the dedicated functions and information theft.

Whilst the embodiments of the present invention have been described in the foregoing, the present invention is not limited only to the above-described embodiments or examples and may be implemented in various modes with modifications made thereto as appropriate. For example, although the individual processing units are implemented by cooperation of software and hardware resources in the above-described embodiments, the present invention is not limited to the described mode of implementation and may be implemented, for example, in a fully hardware-based manner.

The invention claimed is:

1. A numerical controller capable of executing dedicated function software, the numerical controller comprising:
    a volatile primary storage area and a non-volatile secondary storage area; and
    a processor configured to implement programs to:
        read, in response to a reading condition being satisfied, a dedicated function software from an external storage device connected to the numerical controller, wherein the dedicated function software is loaded into the volatile primary storage area mainly accessed by the processor;
        execute the dedicated function software that is loaded in the volatile primary storage area as a process of the numerical controller;
        stop execution of the process of the dedicated function software and delete the dedicated function software from the volatile primary storage in response to a termination condition,
    wherein the termination condition is at least one of a physical removal of connection of the external storage device from the numerical controller, or user input during the process to terminate the process of the dedicated function software; and
        urge a user to select the dedicated function software that should be read into the volatile primary storage area in response to a plurality of pieces of the dedicated function software being detected.

2. The numerical controller according to claim 1, wherein the termination condition is further based on a termination of the dedicated function software detected from the volatile primary storage area.

3. A numerical controller capable of executing dedicated function software, the numerical controller comprising:
    a volatile primary storage area and a non-volatile secondary storage area; and
    a processor configured to implement programs to:
        read a dedicated function software from an external communication device associated with the numerical controller, wherein the dedicated function software is loaded into the volatile primary storage area mainly accessed by the processor;
        execute the dedicated function software that is loaded in the volatile primary storage area as a process of the numerical controller;
        stop execution of the process of the dedicated function software and delete the dedicated function software from the volatile primary storage area in response to a termination condition,
    wherein the termination condition is at least one of a physical removal of connection of the external communication device from the numerical controller, or a deletion request to delete the dedicated function software from the volatile primary storage area; and
        urge a user to select the dedicated function software that should be read into the volatile primary storage area in response to a plurality of pieces of the dedicated function software being detected.

4. The numerical controller according to claim 3, wherein the termination condition is further based on a termination of the dedicated function software.

\* \* \* \* \*